US007734634B2

(12) United States Patent
Rodenburg (10) Patent No.: US 7,734,634 B2
(45) Date of Patent: Jun. 8, 2010

(54) SYSTEM, APPARATUS AND METHOD FOR USING AND MANAGING DIGITAL INFORMATION (76) Inventor: Dirk Rodenburg, 218 Airdrie St., East York, Ontario (CA) M4G 1M8

( * ) Notice: Subject to any disclaimer, the term of this patent is extended or adjusted under 35 U.S.C. 154(b) by 22 days.

(21) Appl. No.: 12/073,247

(22) Filed: Mar. 3, 2008

(65) Prior Publication Data
US 2008/0215515 A1 Sep. 4, 2008

Related U.S. Application Data (63) Continuation of application No. 10/992,292, filed on Nov. 19, 2004, now Pat. No. 7,340,456, which is a continuation of application No. 09/482,908, filed on Jan. 14, 2000, now Pat. No. 6,845,369.

(51) Int. Cl.
G06F 7/00 (2006.01)
(52) U.S. Cl. ........................ 707/750; 707/752; 707/765; 707/766
(58) Field of Classification Search .................. 707/1, 707/10, 100–102, 104.1, 750, 752, 765, 766
See application file for complete search history.

(56) References Cited

U.S. PATENT DOCUMENTS

| 5,469,540 | A | | 11/1995 | Powers, III et al. | |
|---|---|---|---|---|---|
| 5,634,121 | A | * | 5/1997 | Tracz et al. | 707/2 |
| 5,675,819 | A | * | 10/1997 | Schuetze | 704/10 |
| 5,680,511 | A | | 10/1997 | Baker et al. | |
| 5,692,176 | A | * | 11/1997 | Holt et al. | 707/5 |
| 5,696,963 | A | | 12/1997 | Ahn | |
| 5,754,840 | A | * | 5/1998 | Rivette et al. | 707/2 |
| 5,758,148 | A | | 5/1998 | Lipovski | |
| 5,873,107 | A | | 2/1999 | Borovoy et al. | |

(Continued)

OTHER PUBLICATIONS

"Conceptual Graphs"—J. F. Sowa—IBM Jouranl of Research and Development—1976, copyright 1998—Springer Berlin Heidelberg (pp. 1-22 or 295-319).*

(Continued)

Primary Examiner—John E Breene
Assistant Examiner—Anh Ly
(74) Attorney, Agent, or Firm—Sterne, Kessler, Goldstein & Fox P.L.L.C.

(57) ABSTRACT

A system, apparatus and method for using, identifying, interacting and managing digital information in a useful and convenient manner. When a digital representation of information is loaded, an index is constructed of unique terms in the information, which index includes the terms, a count of the occurrences of each term in the information and a reference to each location wherein the term occurs in the information. A user can select a term of interest from the index and a context box comprising a user-selected amount of information from before and/or after each occurrence of the selected term is displayed to the user to allow the user to more readily identify portions of the information which are of interest. The user can select one a context box of interest and the display of the information is repositioned to the location in the information which corresponds to the select box. A user can also create a knowledge base entry from each identified and/or selected portion of the information, which knowledge base can be searched in a variety of manners.

32 Claims, 6 Drawing Sheets

U.S. PATENT DOCUMENTS

| | | | |
|---|---|---|---|
| 5,907,821 A * | 5/1999 | Kaji et al. .................... 704/4 |
| 5,913,215 A | 6/1999 | Rubinstein et al. |
| 6,014,663 A * | 1/2000 | Rivette et al. ................ 707/4 |
| 6,038,561 A * | 3/2000 | Snyder et al. ................ 707/6 |
| 6,064,952 A * | 5/2000 | Imanaka et al. .............. 704/9 |
| 6,104,990 A * | 8/2000 | Chaney et al. ............... 704/9 |
| 6,105,044 A | 8/2000 | DeRose et al. |
| 6,112,212 A | 8/2000 | Heitler |
| 6,115,709 A * | 9/2000 | Gilmour et al. ............... 707/9 |
| 6,154,783 A | 11/2000 | Gilmour et al. |
| 6,173,253 B1 * | 1/2001 | Abe et al. ................... 704/10 |
| 6,212,517 B1 * | 4/2001 | Sato et al. ................... 707/5 |
| 6,215,906 B1 * | 4/2001 | Okada ...................... 382/239 |
| 6,236,768 B1 | 5/2001 | Rhodes et al. |
| 6,240,378 B1 * | 5/2001 | Imanaka et al. .............. 704/9 |
| 6,253,202 B1 | 6/2001 | Gilmour |
| 6,308,176 B1 * | 10/2001 | Bagshaw .................... 707/10 |
| 6,341,176 B1 * | 1/2002 | Shirasaki et al. ........... 382/229 |
| 6,377,949 B1 * | 4/2002 | Gilmour ..................... 707/10 |
| 6,397,209 B1 | 5/2002 | Reed et al. |
| 6,405,197 B2 * | 6/2002 | Gilmour ...................... 707/5 |
| 6,421,669 B1 | 7/2002 | Gilmour et al. |
| 6,434,547 B1 | 8/2002 | Mishelevich et al. |
| 6,473,753 B1 | 10/2002 | Katariya et al. |
| 6,473,754 B1 * | 10/2002 | Matsubayashi et al. ........ 707/5 |
| 6,493,711 B1 | 12/2002 | Jeffrey |
| 6,507,839 B1 | 1/2003 | Ponte |
| 6,510,406 B1 | 1/2003 | Marchisio |
| 6,567,103 B1 | 5/2003 | Chaudhry |
| 6,647,384 B2 | 11/2003 | Gilmour |
| 6,708,165 B2 * | 3/2004 | Jeffrey ........................ 707/5 |
| 6,832,224 B2 | 12/2004 | Gilmour |
| 6,834,276 B1 | 12/2004 | Jensen et al. |
| 6,862,710 B1 | 3/2005 | Marchisio |
| 6,907,562 B1 | 6/2005 | Schuetze |
| 7,051,017 B2 | 5/2006 | Marchisio |
| 7,062,707 B1 | 6/2006 | Knauft et al. |
| 2001/0013029 A1 * | 8/2001 | Gilmour ....................... 707/1 |
| 2002/0072895 A1 * | 6/2002 | Imanaka et al. .............. 704/9 |
| 2002/0165861 A1 * | 11/2002 | Gilmour ....................... 707/7 |
| 2003/0177111 A1 | 9/2003 | Egendorf et al. |
| 2005/0027702 A1 | 2/2005 | Jensen et al. |

OTHER PUBLICATIONS

"Protecting the digital consumer: The limits of Cyberspace Utopianism"—John Rothchild—summer 1999 (pp. 1-106).*

* cited by examiner

SYSTEM, APPARATUS AND METHOD FOR USING AND MANAGING DIGITAL INFORMATION

CROSS REFERENCE TO RELATED APPLICATION

This application is a continuation of U.S. Non-Provisional application Ser. No. 10/992,292, filed Nov. 19, 2004, now U.S. Pat. No. 7,340,456, issued Mar. 4, 2008, which is a continuation of U.S. Non-Provisional application Ser. No. 09/482,908, filed Jan. 14, 2000, now U.S. Pat. No. 6,845,369, issued Jan. 18, 2005, all of which are incorporated herein by reference in their entirety.

FIELD OF THE INVENTION

The present invention relates to a system, apparatus and method for using and managing digital information. More specifically, the present invention relates to a system, apparatus and method for identifying and interacting with digital representations of information, in a useful and convenient manner.

BACKGROUND OF THE INVENTION

With the omnipresence of computers and the Internet, increasing amounts of information are created, distributed and/or accessed in digital form. Examples of such digital forms of information, including text and graphics information, include Adobe's Acrobat (pdf) format, HTML and/or SGML formats, various word processor formats (such as Microsoft Word's 'doc' format or Corel WordPerfect's 'wpd' format), video formats including Apple's QuickTime MOV format and Microsoft's AVI format, MPEG compressed video and many others. Information can be created in, or converted to or between, these formats and distributed and/or stored in them as desired.

While this revolution in distribution and representation of information has many advantages, it does suffer from some disadvantages. For example, especially in view of the development of the Internet, the amount of information available on a macroscopic level can be overwhelming, making it difficult or impossible to recognize relevant information even after it has been located. Specifically, it is not uncommon that a search of the Internet on any common topic will return several hundreds of possible documents of interest which must be reviewed by a user to determine the relevance of the documents to the topic.

On a microscopic level, when a document is under consideration, it can be difficult to find the portions of that document which are of interest or significance. This is especially true for long documents which cannot be displayed on one or two screen displays of a computer monitor, such as legal decisions, technical documents, patents, stories, etc.

It is therefore desired to have a system, apparatus and method which makes easier the identification and interaction with information represented and/or stored in digital form.

SUMMARY OF THE INVENTION

It is an object of the present invention to provide a novel system, apparatus and method for using and managing digital representations of information.

According to a first aspect of the present invention, there is provided a method of using and managing information represented in a digital form, comprising the steps of:

(i) selecting a set of digital information;
(ii) constructing an index of unique terms in said selected digital information, said index further including a count of the occurrence of each term in the digital information and a reference to the location of each occurrence of each unique term in said digital information;
(iii) displaying said index to a user;
(iv) receiving input from said user to select a displayed term and constructing a context box for each occurrence of said selected term, said context box comprising a user-selected amount of said digital information occurring before and/or after the occurrence of said term and displaying said constructed context boxes to said user;
(v) receiving input from said user to select one of said constructed context boxes and displaying said portion of said digital information containing said referenced location of said occurrence of said term to said user.

Preferably, the method also comprises the step of applying a filter to said index, prior to step (iv) to remove terms not of interest to said user.

According to another aspect of the present invention, there is provided a system for using and managing information represented in a digital format, comprising:

storage for maintaining information represented in digital form;
user input means;
user output means;
a computer connected to said storage, user input means and user output means, said computer operable to:

(a) load and display said information to a user with said user output means;
(b) construct an index of unique terms in said information, said index comprising a count of the occurrence of each term in the digital information and a reference to the location of each occurrence of each unique term in said digital information;
(c) display said index to said user;
(d) receive input from said user representing a selection of a term of interest;
(e) construct and display to said user a context box for each occurrence of said selected term, each context box including a user-selected amount of said digital information from before and/or after said occurrence of said selected term in said information; and
(f) receive input from said user representing the selection of a context box of interest and updating said display of said digital information to said user to display the location of the occurrence corresponding to said selected context box.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

For clarity, the following discussion of the present invention relates to an embodiment employed with an html browser. The present invention is not limited to use with html browsers and the present invention can also be used with application programs, browsers for other formats, etc. which allow the viewing and/or interacting with information represented in other digital formats (eg.—pdf, doc, wpd, etc.).

Figure 1:
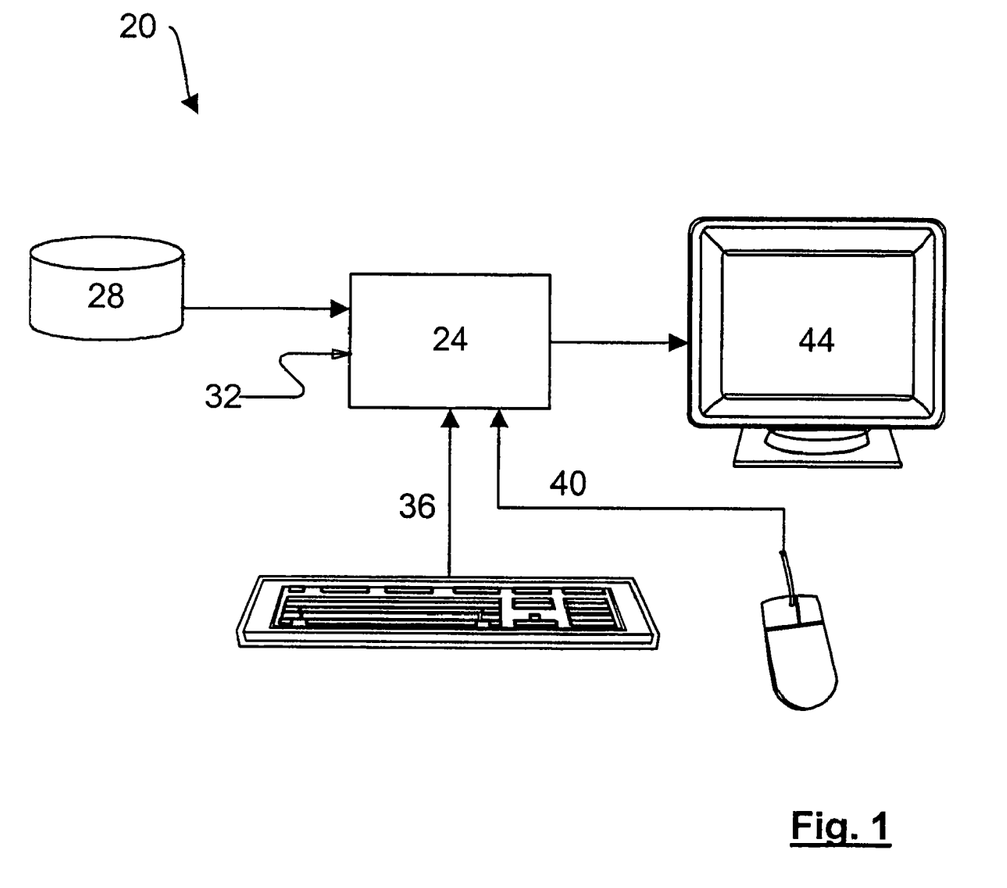
FIG. 1 shows a system, in accordance with an embodiment of the present invention, for identifying, using and managing digital information.

FIG. 1 shows a system 20 for using and managing digital information in accordance with an embodiment of the present invention. System 20 includes a computer 24, including a microprocessor or the like, RAM memory, etc. and executing an operating system and one or more applications programs. For example, computer 24 can be an IBM PC compatible computer including an Intel Pentium IT processor and executing the Microsoft Windows 98 operating system.

Computer 24 can be connected to a mass storage device 28, such as a LAN file server, CDROM or other storage device, and/or to a communications network 32, such as the internet. Computer 24 is also connected to a user input device, such as a keyboard 36 and/or a pointing device 40 and to a user output device 44, such as a computer monitor, LCD panel or television.

Digital information to be used and/or managed with the present invention can be stored on mass storage device 28 and accessed by computer 24 or can be accessed by computer 24 via communications network 32.

In an embodiment of the present invention, a plugin is provided for an html browser, which plugin and browser are executed by computer 24. When digital information is loaded into such a browser, the plugin operates as described below to organize the information. While the following discussion presumes the use of a plugin, the present invention is not so limited and can be implemented as a standalone program or as an application program integrated with program functions to create the digital information display on user output means 44.

Figure 2:
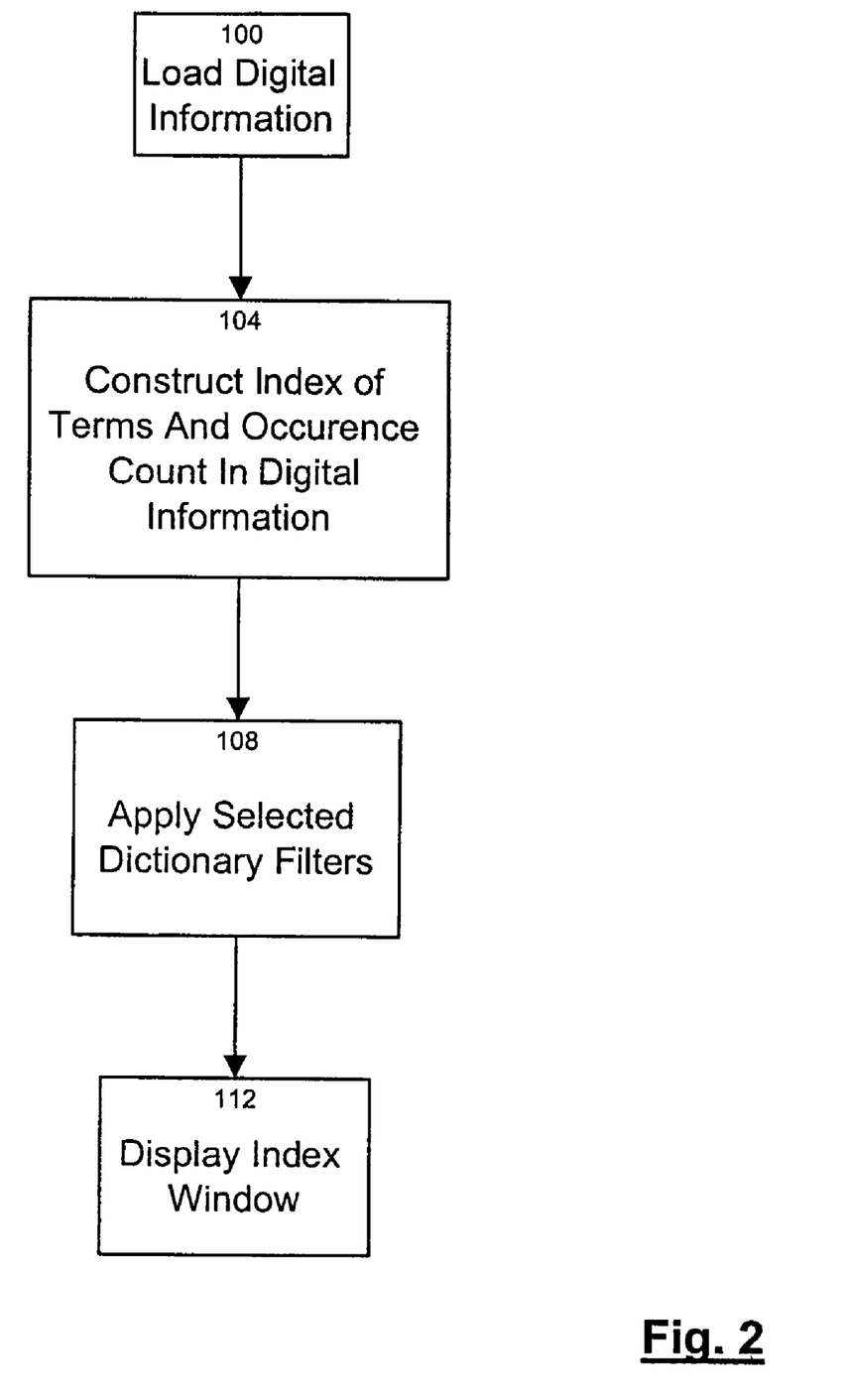
FIG. 2 shows a flowchart of an indexing process in accordance with the present invention.

Specifically, as shown in FIG. 2, the method of the present invention commences at step 100 where digital information, selected by a user via user input means or otherwise selected, is loaded into computer 24 from mass storage device 28 or from communications network 32. At step 104, an index of terms within the digital information is constructed, including an occurrence count for each term, is constructed. In a present embodiment of the invention, "terms" comprise words in the document, although it is also contemplated that "terms" can include figures, graphics, audio and/or video included in the digital information.

When constructed, this index preferably comprises a list of each unique term and includes references between each term and a reference to its location within the digital information, as described below in more detail.

At step 108, any Dictionaries that have been selected by the user are applied to the Index to filter the index. Dictionaries are lists of terms defined by a user and dictionaries can be defined to remove included terms from the index, for example it is contemplated that most users will wish to employ a dictionary to remove articles, prepositions participles and other words of little interest from the index. In addition, dictionaries can also be defined by a user to specify the only terms to be included in the index. For example, a user may be interested only in portions of the digital information which relate to a specific topic and such a user can define a dictionary which contains those terms the user believes relevant to that topic. In such a case, after step 108 is performed, only the occurrences of those terms in the defined dictionary will be included in the index.

At step 112, the developed and, if applicable, filtered index is displayed to the user. It is presently preferred that the index be displayed in a window adjacent the digital information being displayed to the user.

Figure 3:
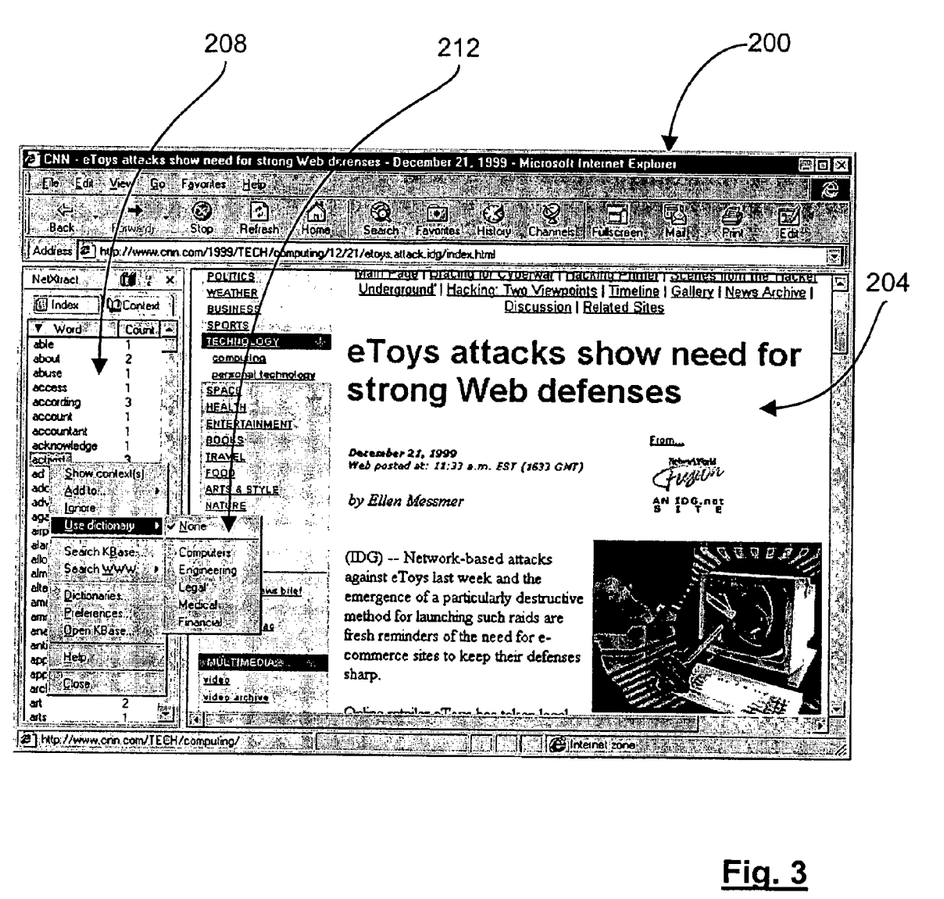
FIG. 3 shows a screen display of an html browser including an embodiment of the present invention.

FIG. 3 shows an html browser 200 which includes a window 204 wherein the digital information is displayed to the user. Another window 208 is displayed adjacent to window 204 and lists the terms of the index constructed for the digital information, in this case an html document, being displayed in window 204. The terms of window 208 can be ordered in a variety of manners including, alphabetic order, as shown, reverse alphabetic order, frequency count order or reverse frequency count order, as desired by the user and as appropriate to the type of terms (words, graphics, etc.). It should be apparent to those of skill in the art that, the html document displayed in window 204 can in fact comprise many tens, or more, of full windows of information through which the user can scroll as desired, but that the index in window 208 is not limited to those terms presently displayed in window 208, but is instead constructed for the entire html document. In the Figure, pop-up menu 212 shows one mechanism whereby a user can select a dictionary to apply to an index.

As mentioned above, in addition to the terms and their frequency of occurrence, the index constructed at step 104 also maintains a reference between each term of the index and the location of each occurrence of that term in the digital information. For example, the word "computer" may occur three times in an html document and the term "computer" in the constructed index will have three references, one to each of the three locations in the document. A reference can be an offset from the beginning of the document, or any other method for locating a position within the document.

Figure 4:
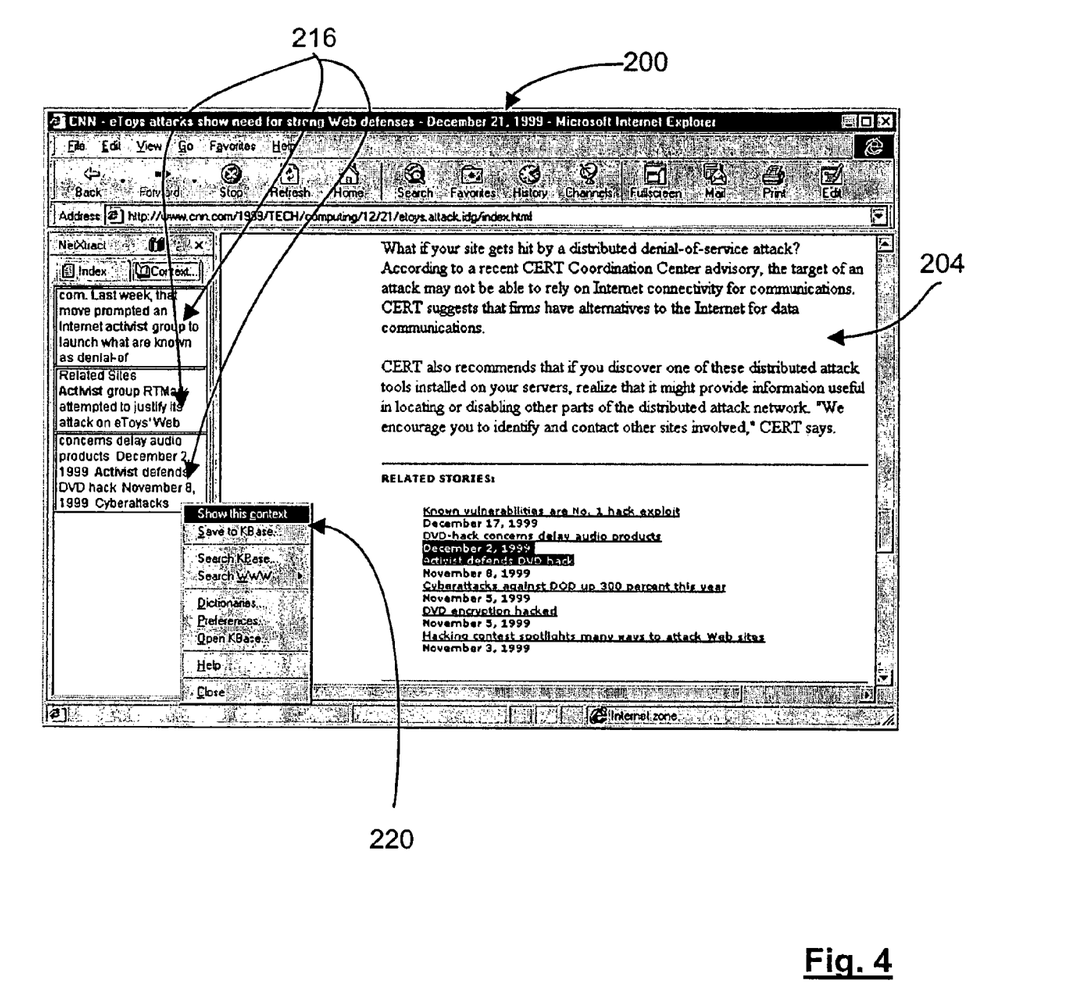
FIG. 4 shows a screen display of the html browser of FIG. 3 wherein an index window is shown in context mode.

Selecting a term in window 208 changes window 208 from index mode to context mode, as shown in FIG. 4. A user can select an indexed term from those displayed in window 208 by any suitable selection method, such as by double clicking it with pointing device 40 and, in FIG. 4, the user has selected the term "activist" from the index in window 208. In context mode, each occurrence of the selected term is displayed in window 208. As shown in FIG. 3, there are three occurrences of "activist" in the html document of window 204 and, in context mode, the context for each occurrence of the selected term is displayed in window 208.

Specifically, a user-selected amount of information, in this example a number of words, before and/or after each occurrence of the selected term is displayed in window 208 to create a context box 216 which better enables a user to identify the occurrences of the selected term that are most of interest. When an occurrence is identified as being of interest, the user can select the particular context box 216 and the reference between the term and its location of occurrence is used to move the display of the document in window 204 to the position wherein that occurrence is located, which movement has already occurred in FIG. 4 where the bottommost context box 216 had been selected by a user. Additional context boxes 216 can be selected, as desired, to examine other portions of the document. Thus, the present invention allows a user to quickly and easily identify and locate portions of a document which are conceivably of interest to the user.

Should the user wish to consult the indexed terms again, the index can be accessed by selecting the tab labeled "Index" at the top of window 208.

In addition to identifying and locating portions of documents of interest, the present invention also allows a user to construct a database, referred to herein as a knowledge base, of information of interest from collections of documents. Specifically, a user can construct a database of information of interest by selecting digital information of interest, by a suitable selection method such as highlighting text displayed in window 204 with pointing device 40, and selecting the menu entry "Save to Kbase" as shown on pop-up menu 220 in FIG. 4.

Figure 5:
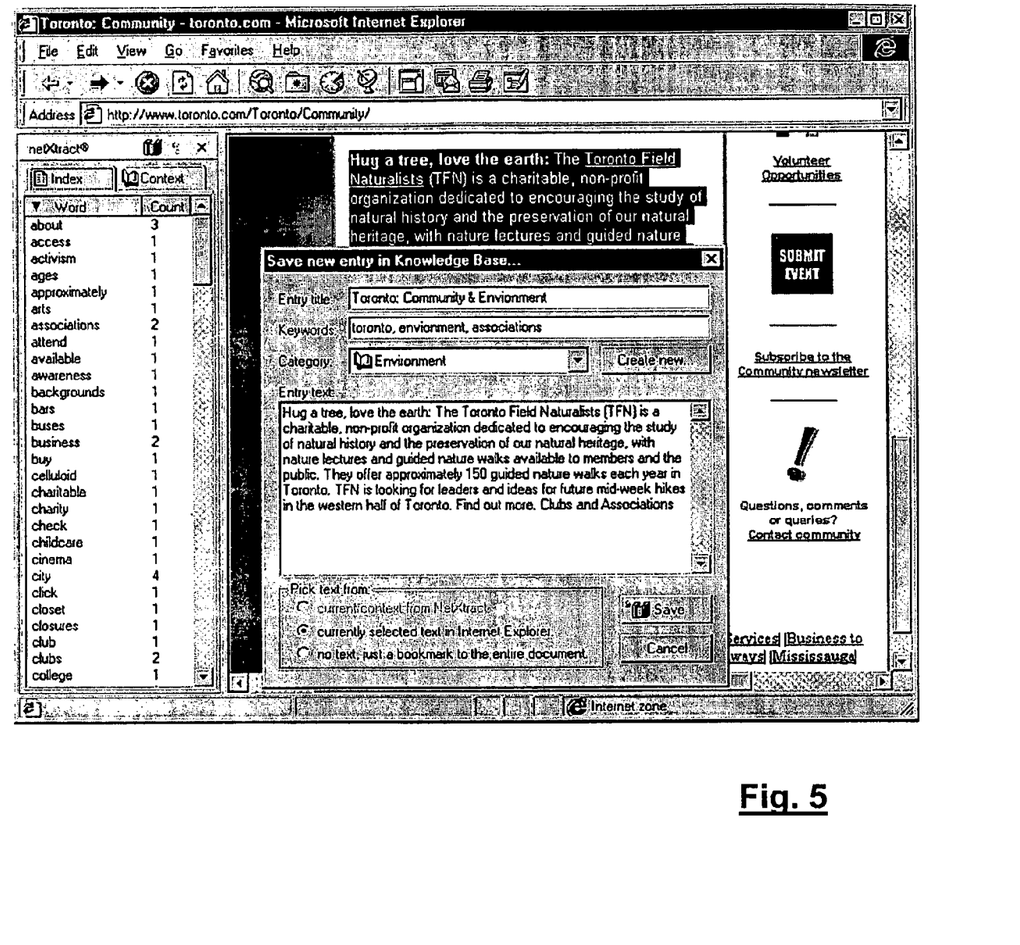
FIG. 5 shows a form for creating a new entry in a knowledge base, in accordance with an embodiment of the present invention.

FIG. 5 shows the knowledge base creation form which is displayed to a user to create an entry. As shown, the selected digital information of interest, in this example text, appears in the form and the user adds a title, zero or more keywords appropriate to the entry, and assigns a category, which can be selected from a drop down menu if pre-existing, or which can be created by pressing the "Create new" box.

Figure 6:
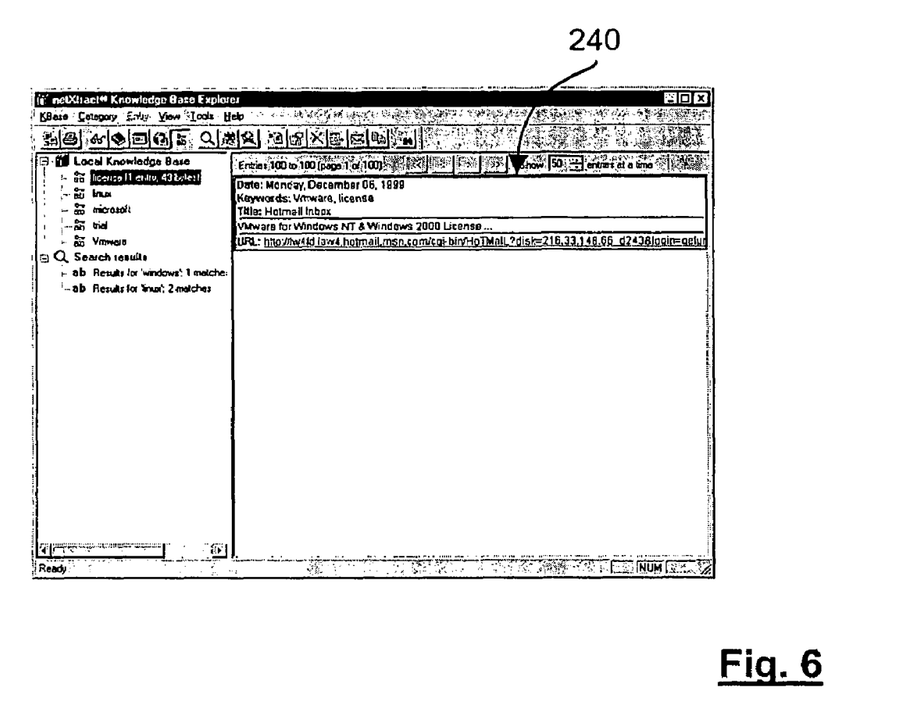
FIG. 6 shows the results of a keyword search in a knowledge base.

FIG. 6 shows a typical entry which has been created in a knowledge base. As shown, each entry is shown in a window 240 and includes the date the entry was created, the keywords, if any, defined by the user when the entry is created, the title, a context excerpt from information of interest and a pointer to locate the original document from which the entry was created. In the case of an html document, the pointer can be a URL. The entry can also include a reference, such as an offset from the beginning of the document, to identify and return to the location within the document where the information of interest occurs.

Figure 7:
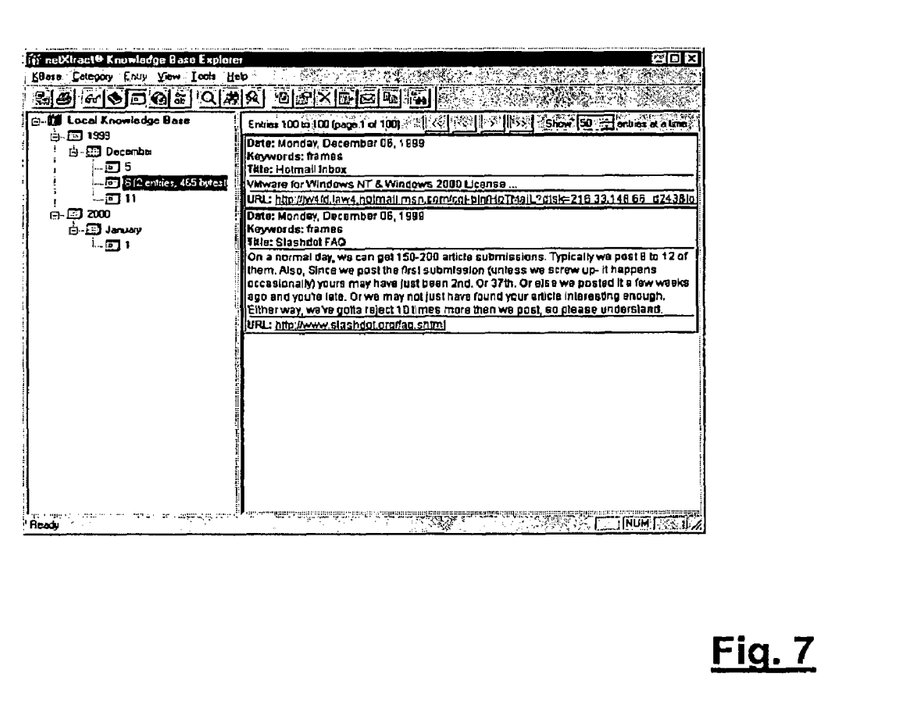
FIG. 7 shows the results of a creation date search in a knowledge base.

The knowledge base can be examined and/or searched on a variety of basis. For example, in FIG. 6 the keyword "license" has been used to locate an entry. In FIG. 7, the date on which the entry was created has been used to locate an entry. Other alternatives to locating entries can include, the source locations of the entries (URL's, etc.), the identity of the user who created the entry (in the case of a shared knowledge base), etc.

As will be apparent, knowledge bases allow users to manage and organize relevant portions of information represented in digital form in a convenient and useful manner. Information sources can be easily re-accessed in appropriate manners, such as by clicking on a URL, if it is desired to examine other portions of the source information and a user can search for information using categories and keyword schemes that they have defined.

The above-described embodiments of the invention are intended to be examples of the present invention and alterations and modifications may be effected thereto, by those of skill in the art, without departing from the scope of the invention which is defined solely by the claims appended hereto.

What is claimed is:

1. An article of manufacture including a tangible computer-readable storage medium having stored thereon computer-executable instructions that, if executed by a computing device, cause the computing device to perform operations comprising:

receiving an electronic document;

constructing an index of terms from the electronic document, the index of terms including a count of each occurrence of each term in the electronic document and a reference to a location in the electronic document of each occurrence of each term;

transmitting the index of terms for display at a display device;

receiving input selecting a term of the displayed index of terms;

constructing a respective context box for each occurrence of the selected term, each context box representing a first respective portion of digital information proximate the selected term in the electronic document;

transmitting at least one context box for display at the display device;

receiving input selecting one context box of the at least one displayed context box; and transmitting, for display in a single display window of the display device distinct from the selected context box displayed at the display device, the selected term and a second respective portion of digital information proximate the selected term in the electronic document, wherein the second respective portion of digital information in the electronic document is greater than the first respective portion of digital information in the electronic document.

2. The article of manufacture of claim 1, the operations further comprising:

applying a filter to the constructed index of terms to remove terms that are on a list associated with the filter.

3. The article of manufacture of claim 2, wherein the list associated with the filter includes one or more terms selected from the group consisting of articles, participles, and prepositions.

4. The article of manufacture of claim 1, the operations further comprising:

applying a filter to the constructed index of terms to remove terms that are not on a list associated with the filter.

5. The article of manufacture of claim 4, wherein the list associated with the filter comprises terms related by topic.

6. The article of manufacture of claim 1, the operations further comprising:

applying a filter to the constructed index of terms, including receiving input selecting the filter from a displayed pop-up list of filters.

7. The article of manufacture of claim 1, the operations further comprising:

receiving input representing a selected portion of digital information adjacent the selected term; and creating a knowledge database entry including the selected portion of digital information adjacent the selected term.

8. The article of manufacture of claim 1, wherein the electronic document includes digital information selected from at least one of the group consisting of text, audio, video, and graphic digital information.

9. The article of manufacture of claim 1, wherein the operation of transmitting the index of terms includes transmitting terms in an order selected from the group consisting of alphabetical order, reverse alphabetical order, frequency count order, and reverse frequency count order.

10. A method comprising:

receiving an electronic document at a processing device;

constructing at the processing device an index of terms from the electronic document, the index of terms including a count of each occurrence of each term in the electronic document and a reference to a location in the electronic document of each occurrence of each term;

transmitting the index of terms for display at a display device;

receiving at the processing device input selecting a term of the displayed index of terms;

constructing at the processing device a respective context box for each occurrence of the selected term, each context box comprising the selected term and a respective first portion of digital information proximate the selected term in the electronic document;

transmitting at least one context box for the selected term for display at the display device;

receiving at the processing device input selecting one context box of the at least one displayed context box; and transmitting, for display in a single display window of the display device distinct from the selected context box, the selected term and a respective second portion of digital information proximate the selected term in the electronic document, wherein the respective second portion of digital information proximate the selected term in the electronic document is greater than the respective first portion of digital information proximate the selected term in the electronic document.

11. The method of claim 10, wherein said receiving an electronic document includes using an application program or browser configured to interact with information in the electronic document represented in a digital format selected from the group consisting of html, pdf, doc and wpd.

12. The method of claim 11, wherein a viewing capability of the application program or browser uses one or more windows.

13. The method of claim 10, wherein said receiving an electronic document includes using an application program or browser comprising an optional plug-in to organize information in the electronic document.

14. The method of claim 10, wherein said transmitting the index of terms includes transmitting terms in an order selected from the group consisting of alphabetical order, reverse alphabetical order, frequency count order, and reverse frequency count order.

15. The method of claim 10, wherein the reference to a location in the electronic document is an offset from a beginning of the electronic document.

16. The method of claim 10, further comprising:
applying a filter to the constructed index of terms to remove terms that are on a list associated with the filter.

17. The method of claim 16, wherein the list associated with the filter includes one or more terms selected from the group consisting of articles, participles, and prepositions.

18. The method of claim 10, further comprising:
applying a filter to the constructed index of terms to remove terms that are not on a list associated with the filter.

19. The method of claim 18, wherein the list associated with the filter comprises terms related by topic.

20. The method of claim 10, further comprising:
applying a filter to the constructed index of terms, including receiving input selecting the filter from a displayed pop-up list of filters.

21. The method of claim 10, further comprising:
receiving input representing a selected portion of digital information adjacent the selected term; and
creating a knowledge database entry including the selected portion of digital information adjacent the selected term.

22. The method of claim 10, wherein the electronic document includes digital information selected from at least one of the group consisting of text, audio, video, and graphic digital information.

23. A system, comprising:
a computing device, including at least one processing device, configured to:
receive an electronic document;
construct an index of terms from the electronic document, the index of terms comprising a count of each occurrence of each term in the electronic document and a reference to a location in the electronic document of each occurrence of each term;
transmit the index of terms for display on a display device;
receive input selecting one term of the displayed index of terms;
construct a respective context box for each occurrence of the selected term, each context box including a respective first portion of digital information proximate the selected term in the electronic document;
transmit at least one context box for display on the display device;
receive input selecting one context box of the at least one displayed context box; and
transmit, for display in a single display window of the display device distinct from the selected context box, the selected term and a respective second portion of digital information proximate the selected term in the electronic document, wherein the respective second portion of digital information proximate the selected term in the electronic document is greater than the respective first portion of digital information proximate the selected term in the electronic document.

24. The system of claim 23, wherein the computing device is further configured to:
apply a filter to the constructed index of terms to remove terms that are on a list associated with the filter.

25. The system of claim 24, wherein the list associated with the filter includes one or more terms selected from the group consisting of articles, participles, and prepositions.

26. The system of claim 23, wherein the computing device is further configured to:
apply a filter to the constructed index of terms to remove terms that are not on a list associated with the filter.

27. The system of claim 26, wherein the list associated with the filter comprises terms related by topic.

28. The system of claim 23, wherein the computing device is further configured to:
apply a filter to the constructed index of terms, including receiving input selecting the filter from a displayed pop-up list of filters.

29. The system of claim 23, wherein the computing device is further configured to:
receive input representing a selected portion of digital information adjacent the selected term; and
create a knowledge database entry including the selected portion of digital information adjacent the selected term.

30. The system of claim 23, wherein the electronic document includes digital information selected from at least one of the group consisting of text, audio, video, and graphic digital information.

31. The system of claim 23, wherein the computing device further is configured to transmit the index of terms in an order selected from the group consisting of alphabetical order, reverse alphabetical order, frequency count order, and reverse frequency count order.

32. A system comprising:
means for receiving an electronic document;
means for constructing an index of terms from the electronic document, the index of terms including a count of each occurrence of each term in the electronic document and a reference to a location in the electronic document of each occurrence of each term;
means for transmitting the index of terms for display at a display device;
means for receiving input selecting a term of the displayed index of terms, constructing a respective context box for each occurrence of the selected term, each context box comprising a respective first portion of digital information proximate the selected term in the electronic document;

means for transmitting at least one context box for display on the display device;

means for receiving input selecting one context box of the at least one displayed context box; and means for transmitting, for display in a single display window of the display device distinct from the selected context box, the selected term and a respective second portion of digital information proximate the selected term in the electronic document, wherein the respective second portion of digital information proximate the selected term in the electronic document is greater than the respective first portion of digital information proximate the selected term in the electronic document.

* * * * *